(12) United States Patent
Foxworth et al.

(10) Patent No.: US 10,585,754 B2
(45) Date of Patent: Mar. 10, 2020

(54) MEMORY SECURITY PROTOCOL

(71) Applicant: International Business Machines Corporation, Armonk, NY (US)

(72) Inventors: Briana E. Foxworth, Round Rock, TX (US); Saravanan Sethuraman, Bangalore (IN); Lucas W. Mulkey, Austin, TX (US); Adam J. McPadden, Underhill, VT (US); Kevin M. Mcilvain, Delmar, NY (US)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 15/678,004

(22) Filed: Aug. 15, 2017

(65) Prior Publication Data
US 2019/0056999 A1     Feb. 21, 2019

(51) Int. Cl.
| G06F 11/00 | (2006.01) |
| G06F 11/14 | (2006.01) |
| G06F 13/40 | (2006.01) |
| G11C 5/14 | (2006.01) |
| G06F 3/06 | (2006.01) |
| G11C 7/20 | (2006.01) |
| G11C 14/00 | (2006.01) |
| G06F 12/02 | (2006.01) |
| G06F 21/79 | (2013.01) |
| G06F 21/44 | (2013.01) |
| G06F 11/20 | (2006.01) |

(52) U.S. Cl.
CPC ........ *G06F 11/1441* (2013.01); *G06F 3/0601* (2013.01); *G06F 11/1456* (2013.01); *G06F 12/02* (2013.01); *G06F 13/4068* (2013.01); *G06F 21/44* (2013.01); *G06F 21/79* (2013.01); *G11C 5/148* (2013.01); *G11C 7/20* (2013.01); *G11C 14/0018* (2013.01); *G06F 11/2015* (2013.01)

(58) Field of Classification Search
CPC ............ G06F 11/0727; G06F 11/0796; G06F 11/1441; G06F 11/1456; G06F 3/0601; G06F 3/4068; G11C 5/148; G11C 7/20; G11C 14/0018
See application file for complete search history.

(56) References Cited

U.S. PATENT DOCUMENTS

| 6,373,768 B2 | 4/2002 | Woo et al. |
| 8,250,350 B2 | 8/2012 | John et al. |
| 9,535,828 B1 | 1/2017 | McKelvie et al. |

(Continued)

OTHER PUBLICATIONS

Foxworth, et al., "Memory Security Protocol", U.S. Appl. No. 15/907,636, filed Feb. 28, 2018.

(Continued)

*Primary Examiner* — Joshua P Lottich
(74) *Attorney, Agent, or Firm* — Robert J. Shatto (57) ABSTRACT

An NVDIMM requests an authentication object in response to a detected command to initiate a save operation to copy first memory data located in volatile memory on the NVDIMM to non-volatile memory located on the NVDIMM. The NVDIMM determines based on the authentication object that authentication has failed. The NVDIMM implements, in response to determining that authentication has failed, a security measure to prevent recovery of the first memory data.

20 Claims, 4 Drawing Sheets

(56) References Cited

U.S. PATENT DOCUMENTS

| | | | |
|---|---|---|---|
| 9,645,829 | B2 | 5/2017 | Jayakumar et al. |
| 9,734,095 | B2 | 8/2017 | Chinnakkonda Vidyapoornachary et al. |
| 9,760,504 | B2 | 9/2017 | Chinnakkonda Vidyapoornachary et al. |
| 9,767,015 | B1 | 9/2017 | McKelvie et al. |
| 9,817,610 | B1 | 11/2017 | Shallal et al. |
| 2007/0294496 | A1 | 12/2007 | Goss et al. |
| 2009/0138754 | A1 | 5/2009 | Edwards |
| 2010/0205349 | A1 | 8/2010 | Moshayedi |
| 2013/0173877 | A1* | 7/2013 | Guo .................. G06F 11/1456 711/162 |
| 2016/0118121 | A1 | 4/2016 | Kelly |
| 2016/0196223 | A1 | 7/2016 | Lee et al. |
| 2016/0224588 | A1 | 8/2016 | Harijono et al. |
| 2016/0239685 | A1 | 8/2016 | Li et al. |
| 2016/0378344 | A1 | 12/2016 | Nachimuthu et al. |
| 2017/0060706 | A1 | 3/2017 | Kinoshita |
| 2017/0060780 | A1 | 3/2017 | Chinnakkonda Vidyapoornachary et al. |
| 2017/0060782 | A1 | 3/2017 | Chinnakkonda Vidyapoornachary et al. |
| 2017/0235675 | A1 | 8/2017 | McKelvie et al. |
| 2017/0235682 | A1 | 8/2017 | Masuyama et al. |
| 2017/0262344 | A1 | 9/2017 | Shaw |
| 2017/0293343 | A1 | 10/2017 | Chinnakkonda Vidyapoornachary et al. |
| 2018/0024768 | A1 | 1/2018 | Nguyen |
| 2018/0060231 | A1 | 3/2018 | Kelly |

OTHER PUBLICATIONS

Accelerated Examination Support Document, dated Feb. 16, 2018, 15 pages.

List of IBM Patents and Patent Applications Treated as Related. Filed Feb. 28, 2018. 2 pages.

Sundararaman et al., "Towards Software Defined Persistent Memory: Rethinking Software Support for Heterogenous Memory Architectures", INFLOW'15, Oct. 4, 2015. 10 pages.

Anonymous, "Data Security in NVDIMM", An IP.com Prior Art Technical Database Technical Disclosure. IP.com No. IPCOM000246467D, Jun. 9, 2016. 6 pages.

Chinnakkonda Vidyapoornachary et al., "System and Method for Conserving Energy in Non-Volatile Dual Inline Memory Modules", U.S. Appl. No. 15/096,599, filed Apr. 12, 2016.

Chang et al., "NVDIMM-N Cookbook: A Soup-to-Nuts Primer on Using NVDIMM-Ns to Improve Your Storage Performance", SNIA Global Education, 2015. 41 pages.

Accelerated Examination Support Document, U.S. Appl. No. 16/392,740, dated Mar. 27, 2019, 15 pages.

Foxworth, et al., "Memory Security Protocol", U.S. Appl. No. 16/392,740, filed Apr. 24, 2019.

List of IBM Patents or Patent Applications Treated as Related, Apr. 22, 2019, 2 pages.

\* cited by examiner

MEMORY SECURITY PROTOCOL

BACKGROUND

The present disclosure generally relates to memory modules, and more specifically, to security protocols for Non-Volatile Dual In-line Memory Modules (NVDIMMs).

Dual in-line memory modules (DIMMs) can include one or more memory chips (e.g., Dynamic Random Access Memory (DRAM)) for data storage. DRAM is commonly included in DIMMs due to its relatively high-performance and low-cost. DRAM chips can include a plurality of integrated circuits and capacitors for data storage. The capacitors of each DRAM cell can store a charge, which can correspond to a bit storage value (e.g., 0, 1). Traditional Dual In-line Memory Modules (DIMMs) typically only include volatile memory, such as DRAM. NVDIMMs, on the other hand, include non-volatile memory (e.g., flash memory) coupled with volatile memory medium (e.g., DRAM) present on the memory module.

SUMMARY

Disclosed herein are embodiments of a method for NDVIMM security. An NVDIMM requests an authentication object in response to a detected command to initiate a save operation to copy first memory data located in volatile memory on the NVDIMM to non-volatile memory located on the NVDIMM. The NVDIMM determines, based on the authentication object, that authentication has failed. The NVDIMM implements, in response to determining that authentication has failed, a security measure to prevent recovery of the first memory data.

Also disclosed herein are embodiments of a Non-Volatile Dual In-line Memory Module (NVDIMM), which includes a volatile memory, a non-volatile memory, and a memory controller. The memory controller is configured to perform a method. The memory controller requests an authentication object in response to a detected command to initiate a save operation to copy first memory data located in volatile memory on an NVDIMM to non-volatile memory located on the NVDIMM. The memory controller determines, based on the authentication object, that authentication has failed. The memory controller implements, in response to determining that authentication has failed, a security measure to prevent recovery of the first memory data.

Also disclosed herein are embodiments of a system for Non-Volatile Dual In-line Memory Module (NVDIMM) security. The system includes an NVDIMM including a volatile memory, a non-volatile memory, and a memory controller, a power supply external to the NVDIMM, and one or more processing circuits. The one or more processing circuits detect a command to initiate a save operation to copy first memory data located in the volatile memory to the non-volatile memory. The memory controller requests an authentication object. The memory controller determines, based on the authentication object, that authentication has failed. The memory controller implements, in response to determining that authentication has failed, a security measure to prevent recovery of the first memory data.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate generally to the field of memory modules, and more specifically, to security protocols for Non-Volatile Dual In-line Memory Modules (NVDIMMs). While the present disclosure is not necessarily limited to such applications, various aspects of the disclosure can be appreciated through a discussion of various examples using this context.

Dynamic Random Access Memory (DRAM) is often used as main memory in computers due to its relative low-cost, high-capacity, and high-performance. However, because data storage in DRAM relies on capacitance, the data must be continually refreshed to ensure data integrity by maintaining the appropriate charge in each capacitor. Accordingly, if power is removed from DRAM, the data stored on the DRAM will be erased, as the capacitors will soon lose their charge corresponding to bit storage values.

Non-volatile memory, such as flash, on the other hand, maintains data integrity in absence of a power supply. Technologies such as NAND Flash can integrate floating gate transistors to store charge (e.g., and thus data bits) in absence of a power supply. However, due to the internal circuitry, performance of non-volatile memories is typically slower than volatile memories.

NVDIMMs combine the speed of volatile memory with the persistence of non-volatile memory. Some variations of NVDIMMs include NVDIMM-N, NVDIMM-F, and NVDIMM-P. An NVDIMM-N appears to the host device to operate as a typical Dual in-line memory module (DIMM), with the host only interacting (e.g., reading/writing) with the DRAM on the module during normal usage. However, if power is lost, another power source on the module (e.g., battery, supercapacitor) or external power source can provide temporary power to the memory module such that the DRAM can be refreshed long enough that it can be backed-up onto a non-volatile memory medium. After power is restored to the NVDIMM-N, the data can be transferred from the non-volatile memory medium back to the DRAM.

An NVDIMM-P (also referred to as Hybrid DIMM) also includes both volatile and non-volatile memory types. However, as opposed to NVDIMM-N, in NVDIMM-P, both the volatile memory and non-volatile memory are accessible by the host during normal usage. Accordingly, NVDIMM-P can be more flexible than NVDIMM-N, as data can be accessed from either the non-volatile or volatile memory under operation. Data stored in the volatile memory can be saved or recovered using the non-volatile memory.

An NVDIMM-F includes non-volatile memory as the primary memory and can exist as an all non-volatile memory (e.g., all flash memory). Accordingly, an NVDIMM-F operates at slower speeds than the other varieties of NVDIMMs, but may not require a power source to maintain data continuity. An NVDIMM-F can also be paired with a traditional DRAM DIMM and/or can contain a DRAM buffer.

The persistence of data stored in memory, which is at the heart of NVDIMM technology, also presents new technological problems. Data stored in a traditional DIMM dissipates quickly when power is removed, which prevents malicious parties or hackers from accessing the data when power is removed. As such, malicious parties cannot remove a traditional DIMM, put that DIMM in another system, and access the data stored on the DIMM as that process will have erased the data on the DIMM. On the other hand, each variation of NVDIMM has a way of preserving some or all of the data stored on an NVDIMM when power is removed and restoring that data or access to that data upon power resumption. In contrast to a traditional DIMM, malicious parties can remove an NVDIMM from a system and obtain potentially valuable data in the absence of an appropriate security system or protocol.

Embodiments of the present disclosure include a security protocol to prevent unauthorized saving of data stored in the volatile portion of an NVDIMM and/or to prevent restoring saved data stored in the non-volatile portion of an NVDIMM. In accordance with embodiments disclosed herein, an authentication protocol can ensure that only authorized users or machines can save such data and/or restore that data. This protocol can utilize one or more private keys which can be sent over the interface. In the event the user or machine provides the correct private key(s), the system can proceed with saving the data stored in the volatile portion of an NVDIMM and/or restoring the saved data stored in the non-volatile portion of an NVDIMM. In the event the user or machine fails to provide the correct private key(s), various security measures can be implemented, including preventing the saving or restoring of data, erasing the data, encrypting the data with an encryption key, or deleting an existing encryption key to render the data permanently encrypted and irrecoverable. Any of these security measures or other such security measures can prevent malicious parties from taking advantage of the persistence of data stored in an NVDIMM. Embodiments which do not call for erasing the data contained within the NVDIMM can be quicker and take less power than erasing the data. Many alternative security or authentication protocols beyond private keys can be envisioned and used in accordance with the present disclosure.

The aforementioned improvements and/or advantages of security, time savings, and power savings are example improvements and/or advantages. These improvements and/ or advantages are a non-exhaustive list of example advantages. Embodiments of the present disclosure exist which can contain none, some, or all of the aforementioned advantages and/or improvements.

Figure 1:
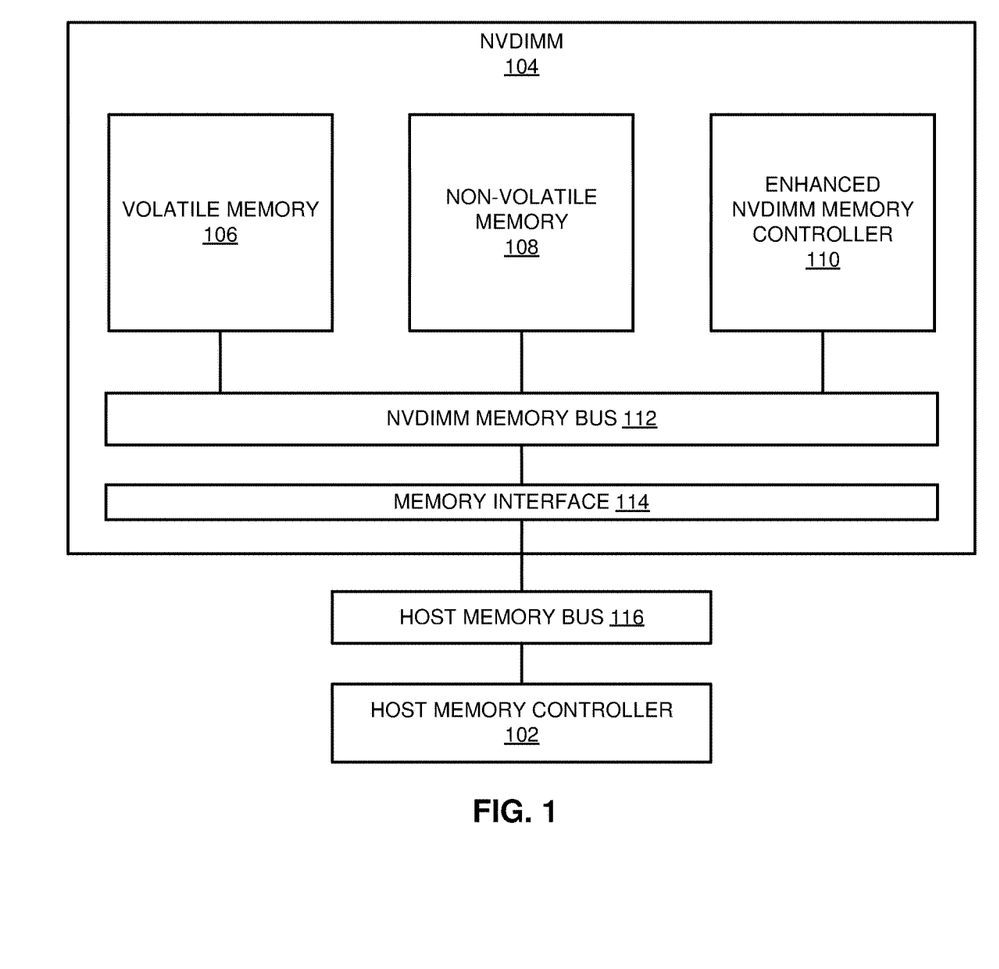
FIG. 1 depicts a block-diagram of an NVDIMM communicatively coupled to a host memory controller, in accordance with some embodiments of the present disclosure.

FIG. 1 depicts one example of a block diagram of a Non-Volatile Dual In-line Memory Module (NVDIMM) 104 communicatively coupled to a host, in accordance with embodiments of the present disclosure. The NVDIMM 104 can include volatile memory 106, non-volatile memory 108, and an enhanced NVDIMM memory controller 110, which can be communicatively coupled to each other for inter-component communication via the NVDIMM memory bus 112. A host memory controller 102 can be communicatively coupled to the NVDIMM 104 via a host memory bus 116 and a memory interface 114. Generally, the enhanced NVDIMM memory controller 110, volatile memory 106, non-volatile memory 108, and host memory controller 102 can be communicatively coupled, directly or indirectly, for inter-component communication via the NVDIMM memory bus 112, memory interface 114, and host memory bus 116.

Volatile memory 106 can include any suitable type of volatile memory (i.e., memory maintained while connected to a power source). Some examples of the type of volatile memory include: Random Access Memory (RAM), Dynamic Random Access Memory (DRAM), Static Random Access Memory (SRAM), Extended Data-out RAM (EDO RAM), Synchronous DRAM (SDRAM), and/or Double Data Rate SDRAM (DDR SDRAM). The type of RAM can be selected based on various features including the data storage, power, data transfer, and price requirements. For example, DRAM is generally inexpensive compared to SRAM, as DRAM requires one transistor and one capacitor per data bit, whereas SRAM requires 6 transistors per data bit. For this reason, DRAM can be used in situations requiring larger data loads in smaller locations (e.g., increased data density). However, SRAM may be advantageous in situations requiring faster data transfer speeds with lower power consumption, as data does not have to be refreshed to account for leaky capacitors (e.g., as used in cache, for example).

Non-volatile memory 108 can include any suitable type of non-volatile memory (e.g., memory maintained without a power supply). Some examples of the type of non-volatile memory include: NAND flash memory, NOR flash memory, Erasable Programmable Read-Only Memory (EPROM), solid-state storage, or Non-Volatile Random Access Memory (NVRAM). The type of RAM can be selected based on various features including the data storage, power, data transfer, and price requirements. In some embodiments, NAND flash memory can be selected, due to its relatively low price, fast read/write/erase times, and long life span (e.g., a high number of erase cycles before memory wear).

Any type of enhanced NVDIMM memory controller 110 can be implemented, and can depend on the architecture of the NVDIMM (e.g., memory channels/types) and actions to be issued. For example, in embodiments with DRAM volatile memory and NAND flash non-volatile memory, the enhanced NVDIMM memory controller 110 can be configured to be compatible with both memory types. That is, in such embodiments, the enhanced NVDIMM memory controller 110 can be configured to read/write to the DRAM and NAND flash, and refresh the DRAM as necessary. Similarly, the enhanced NVDIMM memory controller 110 can be configured to be compatible with a range of memory mediums. In some embodiments, the enhanced NVDIMM memory controller 110 can be a Double Data Rate (DDR) memory controller, such that data can be transferred on the rising and falling edge of each clock cycle (e.g., twice the data transfer capability without increasing the clock rate).

Any number and/or configuration of enhanced NVDIMM memory controllers 110 can be implemented on the NVDIMM 104. In some embodiments, the NVDIMM 104 can include two or more controllers. In some embodiments, one controller can control data flow for the volatile memory 106, and another controller can control data flow for the non-volatile memory 108. In some embodiments, only one controller may be integrated on the NVDIMM 104 (e.g., the enhanced NDIMM memory controller 110). In some embodiments, with multi-channel memory architecture, there can be a memory controller corresponding to each memory channel. Any suitable number of enhanced NVDIMM memory controllers 110 can be implemented on the NVDIMM 104, and may depend on the architecture of the NVDIMM 104.

The enhanced NVDIMM memory controller 110 can be configured to issue any number of actions. The enhanced NVDIMM memory controller 110 can be configured to backup memory (e.g., transfer data from the volatile memory 106 to the non-volatile memory 108, and vice versa). This can occur during a save operation, such as when an NVDIMM experiences a power loss and saves data stored in volatile memory 106 into non-volatile memory 108 to prevent data loss, or a restore operation, such as when power is restored to an NVDIMM and restores data from non-volatile memory 108 to volatile memory 106. The enhanced NVDIMM memory controller 110 can also be configured to request, receive, and authenticate private keys (or other objects indicating authorization) to perform save or restore operations. The enhanced NVDIMM memory controller 110 can also be configured to implement a security measure upon failure to receive a private key (or upon receipt of an incorrect private key) including erasing data, encrypting data with an encryption key, or deleting an existing encryption key to render data permanently encrypted and irrecoverable. Additional examples of actions which enhanced NVDIMM memory controller 110 can be configured to perform include: manage reads/writes (e.g., control the frequency of read/write commands), dictate read/write access (e.g., read from volatile memory 106 versus read from non-volatile memory 108), throttle voltage (e.g., reduce voltage to memory mediums), control refresh rate (e.g., increase or decrease refresh rate of DRAM), and/or vary the scrub rate (e.g., alter frequency at which data is inspected and corrected using a redundant copy of the data).

Any number and/or configuration of host memory controllers 102 can be implemented. In some embodiments, the host memory controller 102 can be integrated on a host processor. In such embodiments, the host memory controller 102 can control data flow from the host processor to the NVDIMM 104. In some embodiments, the host memory controller 102 can be included on a separate chip. In some embodiments, the host can include two or more host memory controllers 102. Any suitable arrangement of integrated and/or stand-alone host memory controllers 102 can be implemented. In some embodiments, no host memory controller 102 may be included.

The host memory controller 102 can be configured to issue commands to the enhanced NVDIMM memory controller 110. The host memory controller 102 can issue commands to the enhanced NVDIMM memory controller 110 to request data from the volatile memory 106 and/or non-volatile memory 108. The enhanced NVDIMM memory controller 110 can then be configured to provide data associated with the volatile memory 106 and/or non-volatile memory 108 to the host memory controller 102. In some embodiments, the host memory controller 102 can directly request data stored in volatile memory 106 and/or non-volatile memory 108. In some embodiments, the host memory controller 102 may not be included, and the aforementioned commands and functions issued by the host memory controller 102 can be completed by the enhanced NVDIMM memory controller 110.

Figure 2:
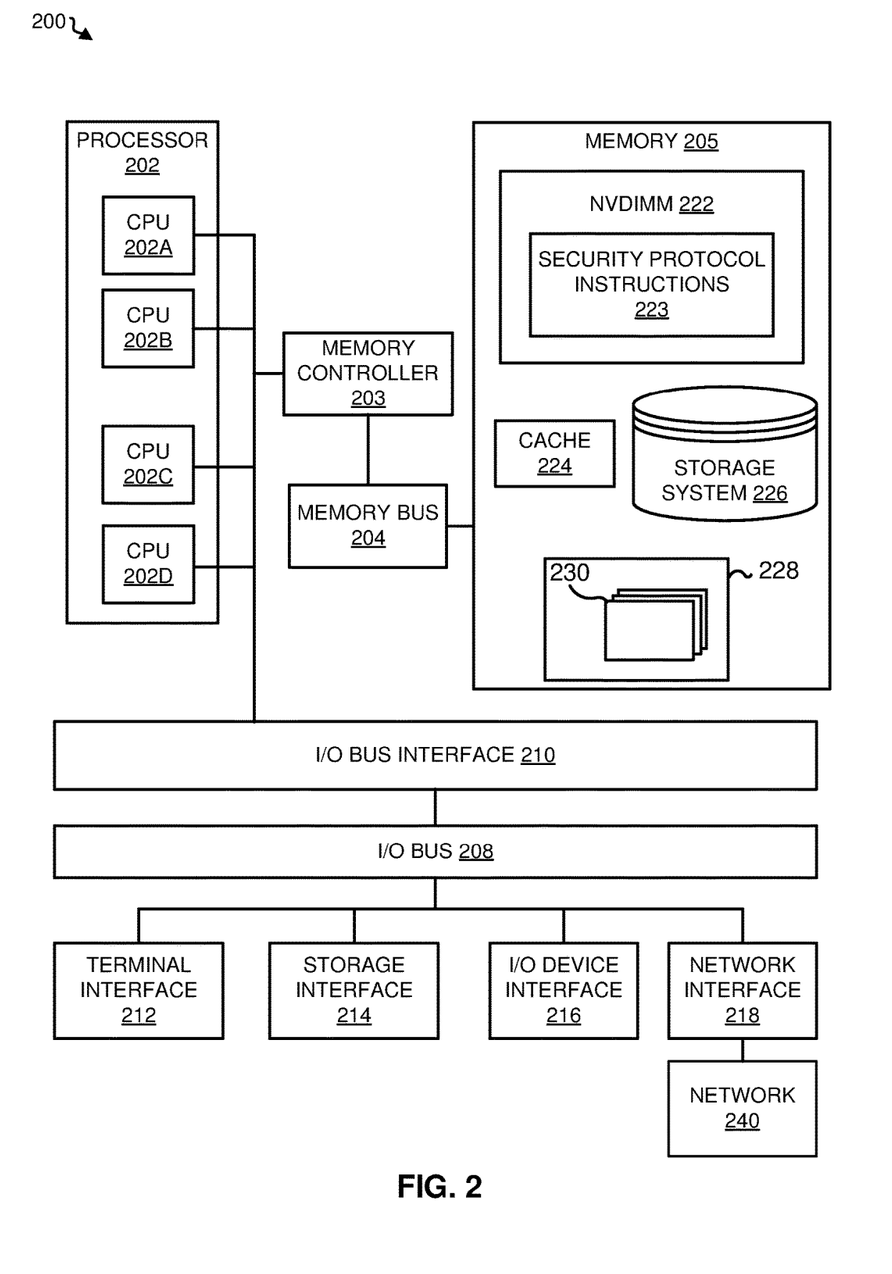
FIG. 2 depicts a high-level block diagram of an example computer system in accordance with some embodiments of the present disclosure.

Referring now to FIG. 2, shown is a high-level block diagram of an example computer system 200 (e.g., a host device) that can be used in implementing one or more of the methods (such as methods 300 and 400 in accordance with FIGS. 3 and 4, respectively, as described infra), tools, and modules, and any related functions, described herein, in accordance with embodiments of the present disclosure. In some embodiments, the components of the computer system 200 can comprise one or more processors 202, a memory subsystem 205, a terminal interface 212, a storage interface 214, an I/O (Input/Output) device interface 216, and a network interface 218, all of which can be communicatively coupled, directly or indirectly, for inter-component communication via a memory bus 204, an I/O bus 208, and an I/O bus interface unit 210.

The computer system 200 can contain one or more general-purpose programmable central processing units (CPUs) 202A, 202B, 202C, and 202D (four CPUs are shown by way of example and should not be read as limiting to or requiring four CPUs), herein generically referred to as processor 202 or CPU 202. Any or all of the CPUs of CPU 202 can contain multiple processing cores in various embodiments. In some embodiments, the computer system 200 can contain multiple processors typical of a relatively large system; however, in other embodiments the computer system 200 can alternatively be a single CPU system. Each CPU 202 can execute instructions stored in the memory subsystem 205 and can include one or more levels of on-board cache that provide temporary storage of instructions and data for the CPUs 202. The CPUs 202 can be comprised of one or more circuits configured to perform one or more methods consistent with embodiments of the present disclosure. The control of data flow from the processor 202 to the memory subsystem 205 can be facilitated by memory controller 203. The memory controller 203 can be configured to direct data to appropriate locations (e.g., addresses) within the memory subsystem 205. The memory controller 203 can be substantially the same as the host memory controller 102.

Memory subsystem 205 can include computer system readable media in the form of NVDIMM 222 and/or cache memory 224. NVDIMM 222 can be substantially the same as NVDIMM 104. Computer system 200 can further include other removable/non-removable, volatile/non-volatile computer system storage media. By way of example only, storage system 226 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 205 can include flash memory, e.g., a flash memory stick drive or a flash drive. In some embodiment, the storage system 226 can be replaced by storage area-network (SAN) devices, the cloud, or other devices connected to the computer system 200 via the I/O device interface 216 or a network 240 via the network interface 218. Memory devices can be connected to memory bus 204 by one or more data media interfaces. For example, NVDIMM 222 can be connected to the memory bus 204 via a memory interface (e.g., memory interface 114 as depicted in FIG. 1). The memory subsystem 205 can include at least one program product having a set (e.g., at least one) of program modules that are configured to carry out the functions of various embodiments. In some embodiments, this program product can be contained within NVDIMM 222 as security protocol instructions 223.

The security protocol instructions 223 of NVDIMM 222 can include computer instructions to perform one or more of the aforementioned operations. For example, the security protocol instructions 223 can include computer instructions to request a private key, security key, or other security object from a user, to receive such key or object, and to authenticate such key or object. The security protocol instructions 223 can also include computer instructions to implement various security measures, including preventing the saving or restoring of data, erasing data, encrypting data with an encryption key, or deleting an existing encryption key to render data permanently encrypted and irrecoverable.

Further, one or more memory modules can be included in the storage system 226. For example, one or more NVDIMM (e.g., NVDIMM 104) can be included in the storage system 226 in lieu of or in addition to the NVDIMM 222. The one or more memory modules can include their own memory controllers (e.g., enhanced NVDIMM memory controller 110), processors, buses, and any other suitable memory module components.

It is noted that FIG. 2 is intended to depict representative components of an exemplary computer system 200. In some embodiments, however, individual components can have greater or lesser complexity than as represented in FIG. 2, components other than or in addition to those shown in FIG. 2 can be present, and the number, type, and configuration of such components can vary.

One or more programs/utilities 228, each having at least one set of program modules 230 can be stored in memory 205. The programs/utilities 228 can include a hypervisor (also referred to as a virtual machine monitor), one or more operating systems, one or more application programs, other program modules, user interfaces, and program data. Each of the operating systems, one or more application programs, other program modules, and program data or some combination thereof, can include an implementation of a networking environment.

The computer system 200 can interface a variety of peripheral devices, storage devices, and networks (including network 240) through the terminal interface 212, storage interface 214, I/O device interface 216, and network interface 218. For example, I/O device interface 216 can receive input from a user and present information to a user and/or a device interacting with computer system 200. In some embodiments, the storage interface 214 can be substantially the same as the memory interface as depicted in FIG. 1 (e.g., memory interface 114). The storage interface 214 can allow the NVDIMM to be communicatively coupled to the computer system 200.

Although the memory bus 204 is shown in FIG. 2 as a single bus structure providing a direct communication path among the CPUs 202, the memory subsystem 205, and the I/O bus interface 210, the memory bus 204 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 210 and the I/O bus 208 are shown as single respective units, the computer system 200 can, in some embodiments, contain multiple I/O bus interface units 210, multiple I/O buses 208, or both. Further, while multiple I/O interface units are shown, which separate the I/O bus 208 from various communications paths running to the various I/O devices, in other embodiments some or all of the I/O devices can be connected directly to one or more system I/O buses.

In some embodiments, the computer system 200 can be a multi-user mainframe computer system, a single-user system, or a server computer or similar device that has little or no direct user interface, but receives requests from other computer systems (clients). Further, in some embodiments, the computer system 200 can be implemented as a desktop computer, portable computer, laptop or notebook computer, tablet computer, pocket computer, telephone, smart phone, network switches or routers, or any other appropriate type of electronic device.

Figure 3:
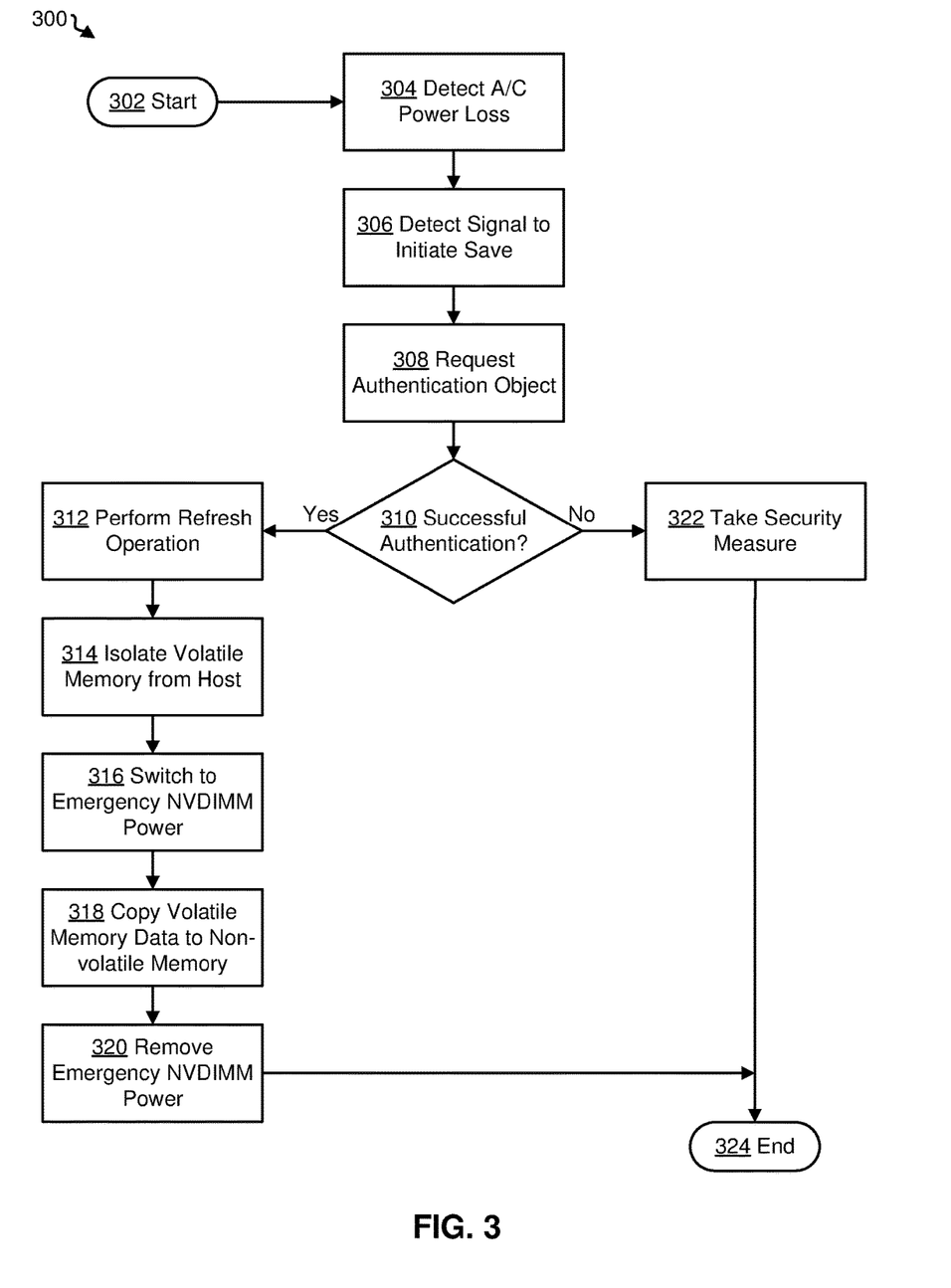
FIG. 3 depicts an example method for a secure NVDIMM save operation, in accordance with embodiments of the present disclosure.

Referring now to FIG. 3, depicted is an example method 300 for a secure NVDIMM save operation, in accordance with embodiments of the present disclosure. Method 300 can be performed by one or more NVDIMMs and/or a computer system which hosts the one or more NVDIMMs. Method 300 can include more or less operations than those depicted. Method 300 can include operations in different orders than those depicted.

From start 302, the one or more NVDIMMs and/or their host computer system detects the loss of alternating current (A/C) power. The loss of A/C power can result from various causes including a power plug or cable being disconnected, a disruption of the power source, a failure of one or more components, or any other cause which results in a loss of power to the one or more NVDIMMs and/or their host computer system. In some embodiments, the NVDIMM of a host computer system can detect the loss of A/C power, and in other embodiments, the host computer system can detect the loss of A/C power. In some embodiments, one or more components of the host computer system can detect that the loss of A/C power is imminent instead of detecting that it has occurred. This operation may be a precursor to the initiation of the save procedure of an NVDIMM, but may not be required in all embodiments. In some embodiments, the one or more NVDIMMs and/or their host computer system may proceed to operation 308 and perform operations 308 and 310 in advance of the one or more NVDIMMs and/or their host computer system detecting the loss of A/C power, which is discussed in detail infra. Once A/C power has been lost, the one or more NVDIMMs and/or their host computer system can switch to a direct current (D/C) backup or the D/C power inherent in a host computer system, which can last for a short period of time after A/C power loss.

At 306, the one or more NVDIMMs detect a signal to initiate an NVDIMM save operation. This signal may be automatically generated when the one or more NVDIMMs and/or their host computer system detects A/C power loss in operation 304. This can occur by a pin on the NVDIMM being pulled low, the clock enable (CKE) being pulled low, 12 volt power being detected, or otherwise via a hardware method. Alternatively, a host memory controller or an NVDIMM memory controller can generate a signal which initiates an NVDIMM save operation.

At 308, the one or more NVDIMMs and/or their host computer system requests an authentication object. The portion of the host computer system which requests the authentication object can be a host memory controller or an NVDIMM memory controller. The form of the authentication object can vary in embodiments. In some embodiments, the authentication object will be a private key, which may take the form of a password, passphrase, fingerprint or other biometric authentication object, or any other such key, or any indication of verifiable authority to authorize an NVDIMM save operation. Alternative forms of authentication can be used in accordance with the present disclosure and will be known to those in the art. The authentication object can be requested of a user of the host computer system, such as by displaying a prompt on a user's monitor or other screen or by generating an audio prompt relayed through a user's speakers or headset. The authentication object can also be requested of the host computer system itself, which can be programmed to provide the authentication object upon request, or the authentication object can be a hardware device contained within or otherwise coupled to the host computer system, which the host computer system scans for upon receiving the request.

In some embodiments, operation 308 can be performed before operations 304 and 306. In such embodiments, the one or more NVDIMMs and/or their host computer system can request the authentication object in preparation for the next time the one or more NVDIMMs and/or their host computer system loses A/C power and detects a signal to initiate a save operation. This can be termed a pre-authorization. Because the one or more NVDIMMs and/or their host computer system may not remain powered for very long after losing A/C power, a user may be unable to enter an authentication object quick enough for the one or more NVDIMMs and/or their host computer system to receive the authentication and perform the save operation. By utilizing a pre-authorization, time can be saved to avoid such an issue. Pre-authorization may occur at various times before detection of A/C power loss, including at boot, when a user logs in to a user account, or any other time. In some embodiments, pre-authorization may only be valid for a set period of time, for example one hour, and operation 308 may repeat at the end of each such period. The shorter the period of time, the more secure the system will be (as there is less time for a malicious party to take the place of a user which has entered a valid authentication object), but repeated prompts to a user may result in user dissatisfaction.

At 310, the one or more NVDIMMs determine if authentication was successful by checking to see if an authentication object was received, and if so, whether the authentication object is valid. Authentication objects can be sent using existing types of protocols including Mode Register Set (MRS) commands, Multi Purpose Registers (MPR), other out of band interfaces such as Inter-Integrated Circuit (I2C) or the Joint Test Action Group (JTAG) standard, NVDIMM messaging protocol, or any other means which can allow the NVDIMM to receive an authentication object. The determination may involve checking a private key or other indication of verifiable authority matches a stored acceptable value or one of multiple stored acceptable values. If the authentication object is valid, the one or more NVDIMMs can determine authentication was successful and method 300 can proceed to operation 312. In the case of pre-authorization, the one or more NVDIMMs and/or their host computer system can delay proceeding to operation 312 until operations 304 and 306 are performed and proceed to operation 312 upon completion of operation 306.

If no authentication object is received, or if the authentication object is invalid (which may be the result if the provided authentication object does not match a stored acceptable value), the one or more NVDIMMs can determine authentication was not successful and method 300 may proceed to operation 322. Alternatively, if authentication was not successful, method 300 can loop back to operation 308 and the one or more NVDIMMs and/or their host computer system can request an authentication object again. This can occur to enable a user or host computer system another opportunity to enter a correct authentication object. The one or more NVDIMMs and/or their host computer system can provide a user or the host computer system a finite number of opportunities to enter a correct authentication object, by counting the number of requests and terminating the loop upon reaching a set number of requests. For example, the one or more NVDIMMs and/or their host computer system may provide three opportunities to enter a correct authentication object and only determine authentication was not successful upon failure to enter a correct authentication object all three times. The one or more NVDIMMs and/or their host computer system may also utilize a timer and determine authentication is not successful if no authentication object is received within the allotted time. In some embodiments utilizing pre-authorization, the one or more NVDIMMs and/or their host computer system can delay proceeding to operation 322 until operations 304 and 306 are performed and proceed to operation 322 upon completion of operation 306, while in other embodiments, the one or more NVDIMMs and/or their host computer system can proceed to operation 322 without requiring operations 304 and 306 to occur.

In the event method 300 proceeds based on the result of operation 310 to operation 312, the one or more NVDIMMs and/or their host computer system performs a refresh operation. In some embodiments, this can be an asynchronous DRAM refresh (ADR). The ADR process flushes the write-protected data buffers of the NVDIMM and places the DRAM in self-refresh. This process performs a refresh of the volatile memory in a burst, before the data stored in the volatile memory can be saved. In some embodiments, a non-maskable interrupt (NMI) or other operation which saves data from a CPU cache into an NVDIMM volatile store can be performed, following which the volatile memory of the NVDIMM is refreshed.

At 314, the one or more NVDIMMs isolate the volatile memory from the remainder of the host computer system. While isolated from the remainder of the host computer system, the volatile memory cannot receive new data, which allows the backup to proceed without issues of data being overwritten or new data needing to be backed up during the process.

At 316, the one or more NVDIMMs switch to emergency power. In some embodiments, this can include one or more supercapacitors, one or more battery backups, one or more uninterruptible power supplies, or any other form of power which can be used while the one or more NVDIMMs back up the data in the following step.

At 318, the one or more NVDIMMs copy the data stored in volatile memory to non-volatile memory. This process can occur using any conventional data transfer techniques and can be performed by a memory controller on the one or more NVDIMMs.

At 320, the one or more NVDIMMs remove emergency power. After completing operation 320, method 300 ends at 324.

In the event method 300 proceeds based on the result of operation 310 to operation 322, the one or more NVDIMMs and/or their host computer system takes a security measure. The type of security measure can vary in embodiments. In some embodiments, the security measure can be that the one or more NVDIMMs do not perform save operations and the contents of the volatile memory will be lost upon power loss. In some embodiments, the one or more NVDIMMs can perform save operations including operations 312 through 318, and additionally encrypt the copied data before performing operation 320. In such embodiments, the encrypted data can be unencrypted at a later time when a user or host computer system provides a valid authentication object. In some embodiments, data stored in the volatile memory can already be encrypted and in some of these embodiments the security measure can include deleting an encryption key to render the data unrecoverable. In some embodiments, alternative security measures which prevent an unauthorized user from accessing the data stored within the one or more NVDIMMs can be implemented. After completing operation 322, method 300 ends at 324.

Figure 4:
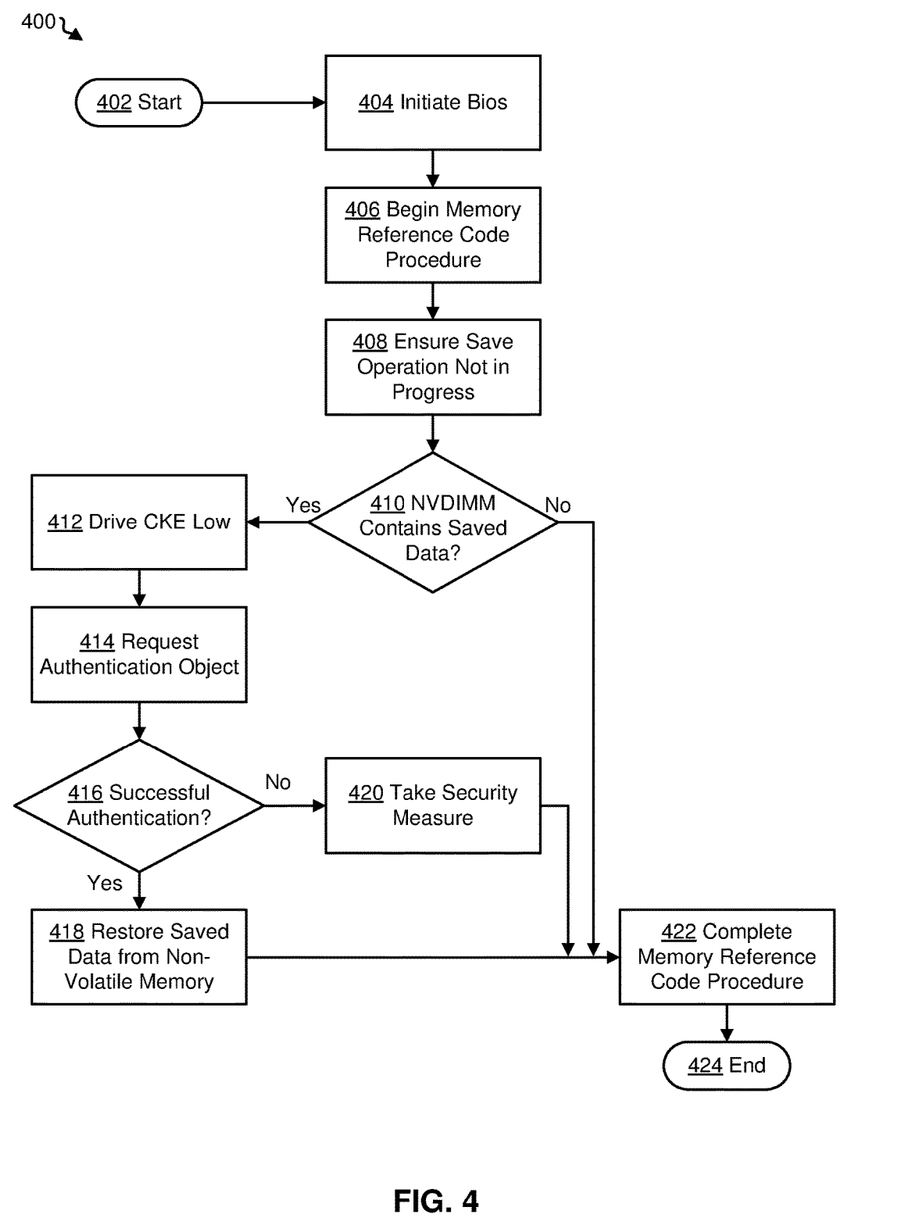
FIG. 4 depicts an example method for a secure NVDIMM restore operation, in accordance with embodiments of the present disclosure.

FIG. 4 depicts an example method 400 for a secure NVDIMM restore operation, in accordance with embodiments of the present disclosure. Method 400 can be performed by one or more NVDIMMs and/or their host computer system. Method 400 can include more or less operations than those depicted. Method 400 can include operations in different orders than those depicted.

From start 402, the host computer system initiates its basic input/output system (BIOS) at 404. This can occur in response to the host computer system powering on. At 406, the host computer system begins memory reference code (MRC) procedure. During the host computer system's MRC procedure, numerous operations may be performed, some of which are omitted in the following discussion, but may occur before, during, or after the described steps. Some of these steps include detection of DIMMs, detection of NVDIMMs, JEDEC double data rate (DDR) initialization sequence, DDR training, DDR auto-refresh, and memory testing.

At 408, the one or more NVDIMMs and/or their host computer system checks whether an NVDIMM save operation is in progress and ensures that it is not. In the event a save operation is in progress, the one or more NVDIMMs and/or their host computer system waits until it completes before proceeding. A save operation could be in progress if a power loss occurred, an NVDIMM began a save operation, such as the secure save operation described in Method 300, and power resumed before the save operation completed.

At 410, the one or more NVDIMMs and/or their host computer system determines whether an NVDIMM contains saved data from a prior save operation. This saved data can refer to data copied from an NVDIMM's volatile memory to its non-volatile memory during an NVDIMM save operation.

If at operation 410, the one or more NVDIMMs and/or their host computer system determined an NVDIMM contains saved data from a prior save operation, method 400 proceeds to operation 412. At 412, the host computer system drives the clock enable (CKE) low, or otherwise puts the DRAM into a safe state. By doing so, the host computer system can prevent the memory from receiving new data while it is performing the restore in the following operations.

At 414, the one or more NVDIMMs and/or their host computer system requests an authentication object. The portion of the host computer system which requests the authentication object can be a host memory controller or an NVDIMM memory controller. The form of the authentication object can vary in embodiments. In some embodiments, the authentication object will be a private key, which may take the form of a password, passphrase, fingerprint or other biometric authentication object, or any other such key, or any indication of verifiable authority to authorize an NVDIMM save operation. Alternative forms of authentication can be used in accordance with the present disclosure and will be known to those in the art. The authentication object can be requested of a user of the host computer system, such as by displaying a prompt on a user's monitor or other screen or by generating an audio prompt relayed through a user's speakers or headset. The authentication object can also be requested of the host computer system itself, which can be programmed to provide the authentication object upon request, or the authentication object can be a hardware device contained within or otherwise coupled to the host computer system, which the host computer system scans for upon receiving the request.

At 416, the one or more NVDIMMs and/or their host computer system determines if authentication was successful by checking to see if an authentication object was received, and if so, whether the authentication object is valid. Authentication objects can be sent using existing types of protocols including Mode Register Set (MRS) commands, Multi Purpose Registers (MPR), other out of band interfaces such as Inter-Integrated Circuit (I2C) or the Joint Test Action Group (JTAG) standard, NVDIMM messaging protocol, or any other means which can allow the NVDIMM to receive an authentication object. The determination may involve checking a private key or other indication of verifiable authority matches a stored acceptable value or one of multiple stored acceptable values. If the authentication object is valid, the one or more NVDIMMs and/or their host computer system can determine authentication was successful and method 400 can proceed to operation 418.

If no authentication object is received, or if the authentication object is invalid (which may be the result if the provided authentication object does not match a stored acceptable value), the one or more NVDIMMs and/or their host computer system can determine authentication was not successful and method 400 may proceed to operation 420. Alternatively, if authentication was not successful, method 400 can loop back to operation 414 and the one or more NVDIMMs and/or their host computer system can request an authentication object again. This can occur to enable a user or host computer system another opportunity to enter a correct authentication object. The one or more NVDIMMs and/or their host computer system can provide a user or the host computer system a finite number of opportunities to enter a correct authentication object, by counting the number of requests and terminating the loop upon reaching a set number of requests. For example, the one or more NVDIMMs and/or their host computer system may provide three opportunities to enter a correct authentication object and only determine authentication was not successful upon failure to enter a correct authentication object all three times. The one or more NVDIMMs and/or their host computer system may also utilize a timer and determine authentication is not successful if no authentication object is received within the allotted time.

In the event method 400 proceeds based on the result of operation 416 to operation 418, the one or more NVDIMMs and/or their host computer system restores the saved data from non-volatile memory to the volatile memory of the one or more NVDIMMs. This process can occur using any conventional data transfer techniques and can be performed by one or more memory controllers on the one or more NVDIMMs.

In the event method 400 proceeds based on the result of operation 416 to operation 420, the one or more NVDIMMs and/or their host computer system takes a security measure. The type of security measure can vary in embodiments. In some embodiments, the security measure can be that the one or more NVDIMMs do not restore the saved data from the non-volatile memory back to the volatile memory. In some embodiments, the one or more NVDIMMs can encrypt the saved data and maintain it in the non-volatile memory where it can be accessed or retrieved later by a user or host computer system with a valid authentication object. In some embodiments, if the saved data stored from the volatile memory was already encrypted and the one or more NVDIMMs contain the encryption key, the security measure can include deleting the encryption key to render the data unrecoverable. In other embodiments, alternative security measures which prevent an unauthorized user from accessing the data stored within the one or more NVDIMMs can be implemented.

Method 400 can reach operation 422 upon determining the one or more NVDIMMs do not contain saved data from a prior save at operation 410, upon completion of a data restore at operation 418, or upon completion of taking a security measure at operation 420. At 422, the host computer system completes the MRC procedure. This can include various operations in various embodiments and may include noting the restore status (or lack thereof) in the MRC output structure, rewriting registers, asserting CKE, performing memory testing and initialization on any DIMMs that did not successfully restore, charging supercapacitors, and enabling backups. After completing operation 422, method 400 ends at 424.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for Non-Volatile Dual In-line Memory Module (NVDIMM) security, the method comprising:
    requesting, by an NVDIMM, an authentication object in response to a detected command to initiate a save operation to copy first memory data located in volatile memory on the NVDIMM to non-volatile memory located on the NVDIMM;
    determining, by the NVDIMM and based on the authentication object, that authentication has failed; and
    implementing, by the NVDIMM and in response to determining that authentication has failed, a security measure to prevent recovery of the first memory data.

2. The method of claim 1, wherein the first memory data located in the volatile memory on the NVDIMM is erased when power to the NVDIMM is removed; and
    wherein implementing the security measure to prevent recovery of the first memory data comprises failing to copy the first memory data located in the volatile memory on the NVDIMM to the non-volatile memory on the NVDIMM.

3. The method of claim 1, wherein second memory data is located in non-volatile memory on the NVDIMM, the second memory data being a copy of the first memory data located in the volatile memory on the NVDIMM; and
    wherein the implementing the security measure further prevents recovery of the second memory data.

4. The method of claim 3, wherein the first memory data located in the volatile memory on the NVDIMM is erased when power to the NVDIMM is removed by; and
    wherein implementing the security measure to prevent recovery of the first memory data comprises one of:
    rejecting execution of a command to restore the second memory data;
    deleting the second memory data; or
    encrypting the second memory data.

5. The method of claim 3, wherein the first memory data located in the volatile memory on the NVDIMM is erased when power to the NVDIMM is removed; and encrypting, by the computer, the second memory data using an encryption key; and
    wherein implementing the security measure to prevent recovery of the first memory data comprises deleting the encryption key.

6. The method of claim 1, wherein the authentication object is a private key.

7. The method of claim 6, wherein the private key is selected from the group consisting of a password, a passphrase, a fingerprint, and a biometric authentication object.

8. The method of claim 1, wherein the determining that authentication has failed comprises determining a computer which includes the NVDIMM does not contain a proper hardware authentication device.

9. A Non-Volatile Dual In-line Memory Module (NVDIMM) comprising:
    a volatile memory;
    a non-volatile memory; and
    a memory controller, wherein the memory controller is configured to perform a method comprising:
    requesting an authentication object in response to a detected command to initiate a save operation to copy first memory data located in volatile memory on an NVDIMM to non-volatile memory located on the NVDIMM;
    determining, based on the authentication object, that authentication has failed; and
    implementing, in response to determining that authentication has failed, a security measure to prevent recovery of the first memory data.

10. The NVDIMM of claim 9, wherein implementing the security measure to prevent recovery of the first memory data comprises failing to copy the first memory data located in the volatile memory to the non-volatile memory before the power to the NVDIMM ceases and the first memory data located in the volatile memory is erased.

11. The NVDIMM of claim 9, wherein second memory data is located in non-volatile memory, the second memory data being a copy of the first memory data located in the volatile memory; and
    wherein the implementing the security measure further prevents recovery of the second memory data.

12. The NVDIMM of claim 11, wherein the method performed by the memory controller further comprises:
    detecting elimination of power to the NVDIMM, wherein the first memory data located in the volatile memory is erased; and
    wherein implementing the security measure to prevent recovery of the first memory data comprises one of:
    rejecting execution of a command to restore the second memory data;
    deleting the second memory data; or
    encrypting the second memory data.

13. The NVDIMM of claim 11, wherein the method performed by the memory controller further comprises:
    detecting elimination of power to the NVDIMM, wherein the first memory data located in the volatile memory is erased; and
    encrypting the second memory data using an encryption key; and
wherein implementing the security measure to prevent recovery of the first memory data comprises deleting the encryption key.

14. The NVDIMM of claim 9, wherein the authentication object is a private key and is selected from the group consisting of a password, a passphrase, a fingerprint, and a biometric authentication object.

15. A system for Non-Volatile Dual In-line Memory Module (NVDIMM) security, the system comprising:
   an NVDIMM including a volatile memory, a non-volatile memory, and a memory controller;
   a power supply external to the NVDIMM; and
   one or more processing circuits, wherein the memory controller and one or more processing circuits are configured to perform a method comprising:
   detecting, by the one or more processing circuits, a command to initiate a save operation to copy first memory data located in the volatile memory to the non-volatile memory;
   requesting, by the memory controller, an authentication object;
   determining, by the memory controller and based on the authentication object, that authentication has failed; and
   implementing, by the memory controller and in response to determining that authentication has failed, a security measure to prevent recovery of the first memory data.

16. The system of claim 15, the method further comprising:
   detecting, by the memory controller, cessation of power from the power supply to the NVDIMM, wherein the first memory data located in the volatile memory is erased; and
   wherein implementing the security measure to prevent recovery of the first memory data comprises failing to copy the first memory data located in the volatile memory to the non-volatile memory.

17. The system of claim 15, wherein second memory data is located in non-volatile memory on the NVDIMM, the second memory data being a copy of the first memory data located in the volatile memory on the NVDIMM; and
   wherein the implementing the security measure further prevents recovery of the second memory data.

18. The system of claim 17, the method further comprising:
   detecting, by the memory controller, cessation of power from the power supply to the NVDIMM, wherein the first memory data located in the volatile memory is erased; and wherein implementing the security measure to prevent recovery of the first memory data comprises one of:
   rejecting execution of a command to restore the second memory data;
   deleting the second memory data; or
   encrypting the second memory data.

19. The system of claim 17, the method further comprising:
   detecting, by the memory controller, cessation of power from the power supply to the NVDIMM, wherein the first memory data located in the volatile memory is erased; and
   encrypting the second memory data using an encryption key; and
   wherein implementing the security measure to prevent recovery of the first memory data comprises deleting the encryption key.

20. The system of claim 15, wherein the authentication object is a private key and is selected from the group consisting of a password, a passphrase, a fingerprint, and a biometric authentication object.

* * * * *